(12) United States Patent
Lau

(10) Patent No.: US 8,630,651 B2
(45) Date of Patent: Jan. 14, 2014

(54) COST EFFECTIVE CALL ROUTING FROM IMS NETWORKS TO LOCAL CARRIER NETWORKS

(75) Inventor: Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 938 days.

(21) Appl. No.: 12/764,429

(22) Filed: Apr. 21, 2010

(65) Prior Publication Data

US 2011/0263263 A1  Oct. 27, 2011

(51) Int. Cl.
*H04W 4/16* (2009.01)

(52) U.S. Cl.
USPC ............. 455/445; 455/422.1; 455/554.1; 455/554.2; 455/555

(58) Field of Classification Search
USPC ............. 455/445, 422.1, 554.1, 554.2, 555; 370/401, 351, 356

See application file for complete search history.

(56) References Cited

U.S. PATENT DOCUMENTS

| 2003/0147380 A1* | 8/2003 | Hakuli .................. 370/352 |
| 2006/0268902 A1* | 11/2006 | Bonner .................. 370/401 |
| 2009/0219924 A1* | 9/2009 | Watanabe et al. .......... 370/352 |
| 2009/0310773 A1* | 12/2009 | Long et al. .............. 379/219 |

* cited by examiner

*Primary Examiner* — Lester Kincaid
*Assistant Examiner* — Dung Lam (57) ABSTRACT

A call placed by a mobile device may be routed to landline destinations using cost-sensitive routing techniques. The call may be routed based on whether it is an intra-MTA (major trade area) or inter-MTA call. In one implementation, a device may receive message initiating a call and determine the MTA of the calling party based on a cell/sector identifier in the message. The device may further determine the MTA of the called party based on the called telephone number. The device may route the call based on whether the MTA of the calling party matches the MTA of the called party.

8 Claims, 9 Drawing Sheets

COST EFFECTIVE CALL ROUTING FROM IMS NETWORKS TO LOCAL CARRIER NETWORKS

BACKGROUND

The telephone system in most countries, such as the United States, includes a number of connected networks. For example, local exchange carriers (LECs) may maintain wireline telephone connections for users in one or more local access and transport areas (LATAs), where a LATA is a geographical area defined by regulation. Interexchange carriers (IXCs), frequently called long distance carriers, may provide inter-LATA communication services. Still further, wireless carriers may operate networks that serve mobile users.

Different networks in the telephone system, such as networks of various carriers, are connected to one another so that calls can be completed between calling and called parties regardless of the network from which a call originates or is destined. Carriers may charge fees to one another when completing a call initiated on another carrier's network.

DETAILED DESCRIPTION

The following detailed description refers to the accompanying drawings. The same reference numbers in different drawings may identify the same or similar elements. Also, the following detailed description does not limit the invention.

Implementations described herein may include as a system for routing wireless calls to landline devices using cost-sensitive routing techniques. In one implementation, a wireless-to-landline call may be examined to determine if the call is an intra-MTA (major trade area) call. If so, the call may be routed directly to a local exchange carrier. Otherwise, the call may be routed to an inter-exchange carrier.

Figure 1:
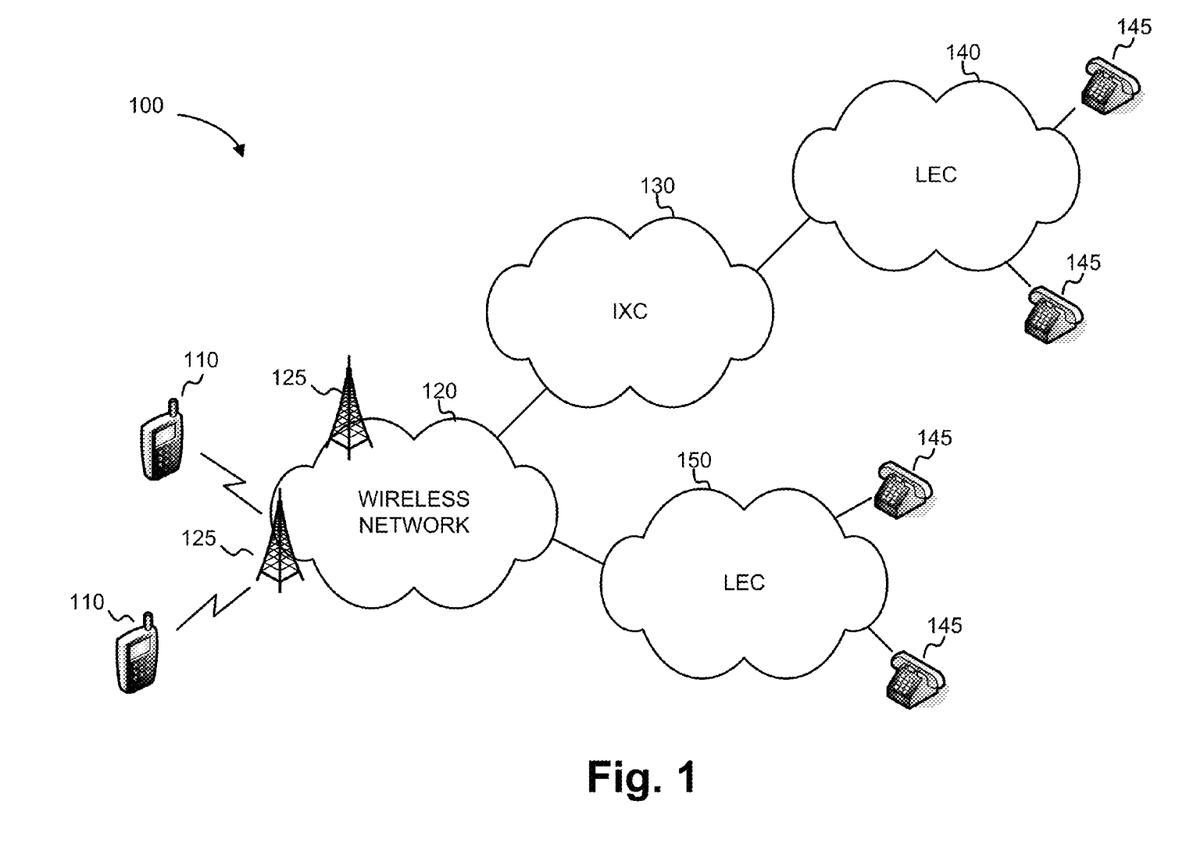
FIG. 1 is a diagram illustrating an example of a telecommunication system.

FIG. 1 is a diagram illustrating an example of a telecommunication system 100. Telecommunication system 100 may include a number of networks, such as a wireless network 120, an interexchange carrier (IXC) network 130, and local exchange carrier (LEC) networks 140 and 150.

Wireless network 120 may include a network designed to provide access to wireless communication devices, such as mobile devices 110. Wireless network 120 may include one or more base stations 125 that provide wireless connectivity to mobile devices 110. Mobile devices 110 may include, for example, mobile telephones, smart phones, electronic notepads, and/or personal digital assistants (PDAs). Mobile devices 110 may establish wireless communication sessions with base stations 125. The wireless communication sessions may be used for voice (e.g., telephone calls) or data sessions.

Wireless network 120 may additionally include other "core" network components designed to facilitate communications with mobile devices 110. For example, wireless network 120 may include one or more servers designed to provide signaling and data transport between mobile devices 110 and/or between other networks. The core portion of wireless network 110 may be connected using non-wireless connections. In general, the "wireless" portion of wireless network 120 may refer to wireless network 120 being designed to provide service to mobile devices 110.

IXC network 130 may include a network for carrying traffic, such as voice or data traffic, between telephone exchanges (i.e., LECs 140/150) and/or wireless network 120. IXC network 130 may carry either or both analog or digital traffic.

LECs 140 and 150 may include networks designed to connect calls with landline or wired telephones. Each LEC 140/150 may be managed and maintained by, for example, a regional telephone carrier that handles the management of local telephone lines and the provisioning of local phone services within the area served by LEC 140/150. Telephones 145 may include conventional telephones, such as telephones connected through plain old telephone service (POTS) connections.

Although FIG. 1 illustrates exemplary components of a telecommunication system 100, in other implementations, telecommunication system 100 may include additional, fewer, different, or differently arranged components than those illustrated in FIG. 1 and described herein.

When routing calls between networks, such as wireless network 120, IXC 130, or LECs 140/150, the geographical location of the calling and called parties may be relevant to which networks a call should be routed. For instance, in the United States, 51 major trading areas (MTAs) are defined, in which each MTA corresponds to a predetermined geographical area. Calls between MTAs may be required to be routed differently than calls that are within an MTA.

For a call between two mobile devices 110, the mobile carrier (i.e., the operator of wireless network 120), may directly connect the call regardless of whether the call is an inter-MTA or an intra-MTA call. In other words, a mobile carrier may route and deliver a mobile-to-mobile call directly to the called party without sending the call to LEC 140/150 or IXC 130.

For a call from a mobile device 110 to one of telephones 145 (mobile-to-land call), the mobile carrier may route the call to either LEC 140/150 or IXC 130. Whether a call can be routed directly to a LEC 140/150 or first to IXC 130 may depend on whether the call is an intra-MTA call or an inter-MTA call. Because access fees charged by IXCs may generally be higher than local termination fees charged by LECs, it is desirable for the wireless provider to route mobile-to-land calls directly to LECs when possible.

Figure 2:
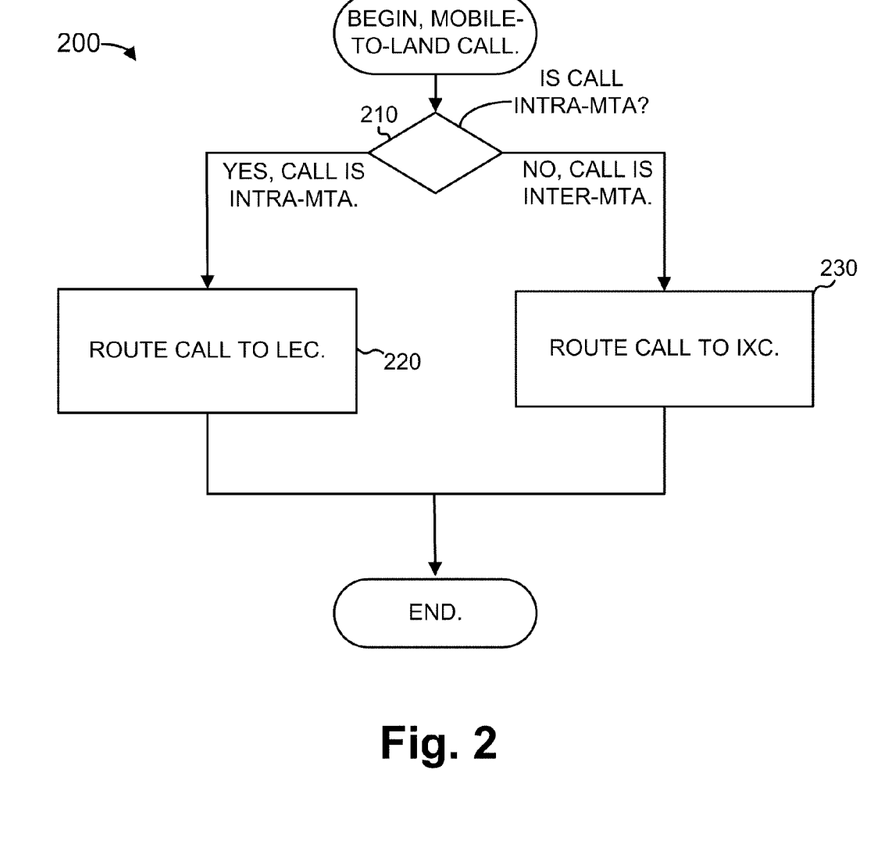
FIG. 2 is a flow chart illustrating an example of a process for routing mobile-to-land calls.

FIG. 2 is a flow chart illustrating an example of a process 200 for routing mobile-to-land calls. Process 200 may be performed by components in wireless network 120. In one implementation, wireless network 120 may implement the Internet Protocol (IP) multimedia subsystem (IMS) standard. In this situation, IMS servers may perform process 200.

Process 200 may include determining if the call from a mobile device 110 is an intra-MTA call or an inter-MTA call (block 210). Determining whether a call from a mobile device 110 is an intra-MTA call may include determining the MTAs of the calling device and the terminating device. Determining whether a call from a mobile device 110 is an intra-MTA call will be described in more detail below with reference to FIGS. 3-6.

If the call is determined to be an intra-MTA call (block 210—YES), the call may be directly routed to the LEC 140/150 associated with the terminating device (block 220). Routing the call directly to the terminating LEC 140/150 may be particularly beneficial in situations in which routing calls to IXC 130 will incur higher fees from the entity that controls IXC 130 than the entity that controls LEC 140/150. Directly routing calls to LEC 140/150, as performed in block 220, will be described in more detail below with reference to FIGS. 7 and 8.

If the call is determined to be an inter-MTA call (block 210—NO), the call may be routed to IXC 130 (block 230).

The determination of whether a call from a mobile device 110 is an intra-MTA call or an inter-MTA call will next be described. As previously mentioned, the determination may be made by components implementing IMS in wireless network 120.

Figure 3:
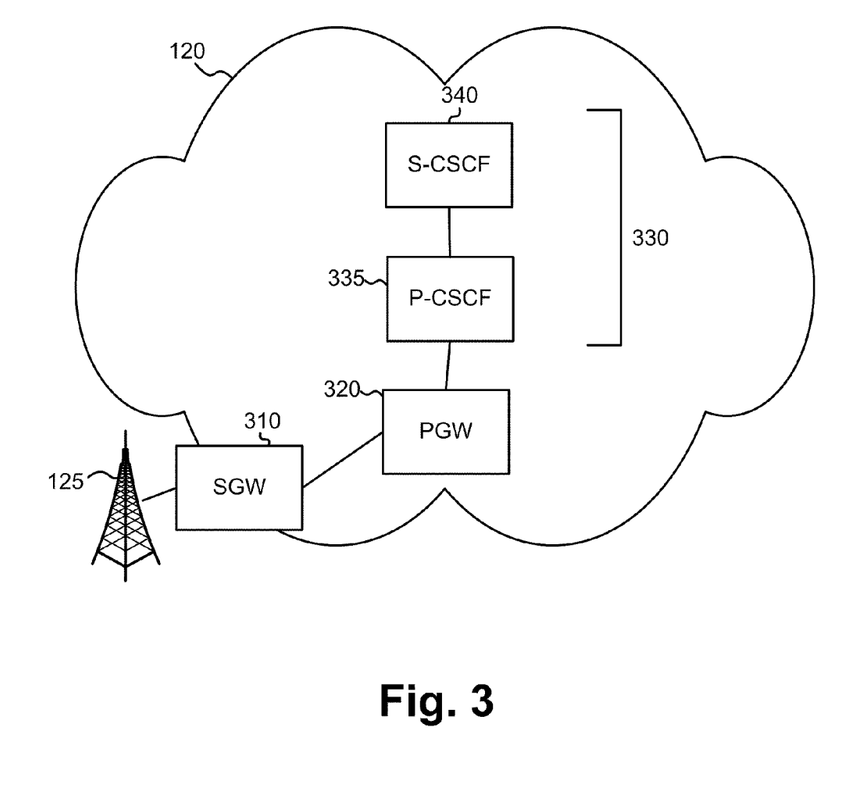
FIG. 3 is a diagram illustrating an example of components in a wireless network.

FIG. 3 is a diagram illustrating an example of components in wireless network 120.

As shown, wireless network 120 may include a signaling gateway (SGW) 310, packet gateway (PGW) 320, and call session control function (CSCF) 330. CSCF 330 may particularly include proxy call session control function (P-CSCF) server 235 and serving call session control function (S-CSCF) server 240.

SGW 310 may perform signaling conversion between the transport used between base station 125 and the IP-based transport used within wireless network 120.

PGW 320 may act as a gateway for wireless network 120. PGW 320 may also provide connections to additional networks, such as a public IP-based network.

CSCF 330 may include a number of signal initiation protocol (SIP) servers or proxies that process SIP signaling packets in the IMS system. P-CSCF server 335 may act as the first point of contact for mobile devices 110 for IMS services. Each mobile device 110 may be assigned a P-CSCF server 335 during registration of the device. P-CSCF server 335 may subsequently operate in the signaling path of IMS messages.

S-CSCF server 340 may act as the central node for the IMS signaling plane for calls, such as all non-emergency calls. S-CSCF server 340 may connect to a database that includes data relating to mobile devices 110, such as authorization information, preferences, or other subscriber-specific information. Based on the client information, S-CSCF server 340 may handle SIP registration of the clients, routing, and network policy enforcement.

P-CSCF server 335 and S-CSCF server 340 will be generally referred to herein as CSCF 330. In some implementations, CSCF 330 may include additional servers or other devices.

Although FIG. 3 illustrates exemplary components of wireless network 120, in other implementations, wireless network 120 may include additional, fewer, different, or differently arranged components than those illustrated in FIG. 3 and described herein. For example, wireless network 120 may include many SGWs 310, PGWs 320, P-CSCF servers 335, and S-CSCF servers 340. Moreover, one or more of the functions performed one of the components shown in FIG. 3 may be performed by other components shown in FIG. 3.

Figure 4:
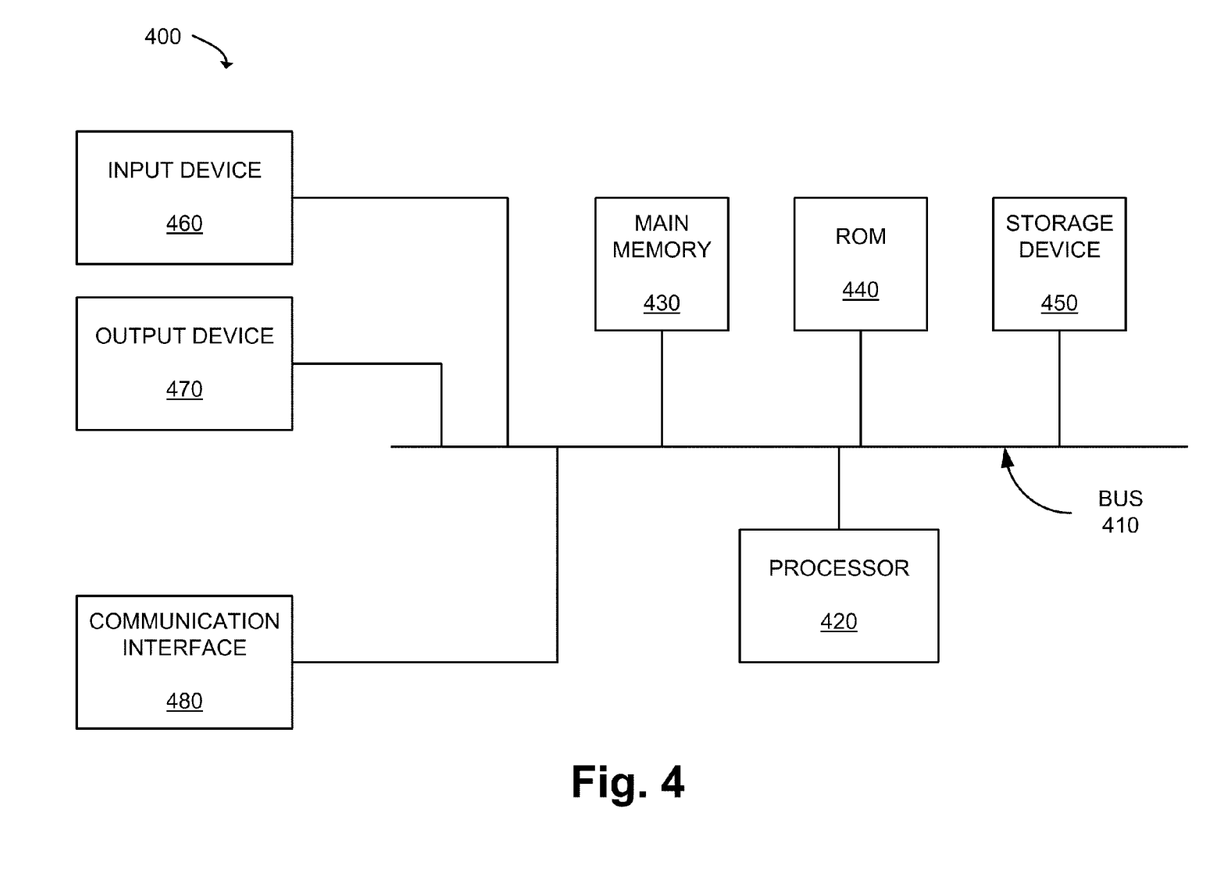
FIG. 4 is a diagram of exemplary components of a device in the wireless network shown in FIG. 3.

FIG. 4 is a diagram of exemplary components of a device 400, which may correspond to a network device (e.g., a server, a database, SGW 310, PGW 320, P-CSCF server 335, and/or S-CSCF server 340) in wireless network 120. As shown in FIG. 4, device 400 may include a bus 410, a processor 420, a main memory 430, a read only memory (ROM) 440, a storage device 450, an input device 460, an output device 470, and a communication interface 480.

Bus 410 may include a path that permits communication among the components of device 400. Processor 420 may include a processor, a microprocessor, or processing logic (e.g., an application specific integrated circuit (ASIC) or a field programmable gate array (FPGA)) that may interpret and execute instructions. Main memory 430 may include a random access memory (RAM) or another type of dynamic storage device that may store information and instructions for execution by processor 420. ROM 440 may include a ROM device or another type of static storage device that may store static information and instructions for use by processor 420. Storage device 450 may include a magnetic and/or optical recording medium and its corresponding drive, or a removable form of memory, such as a flash memory.

Input device 460 may include a mechanism that permits an operator to input information to device 400, such as a keyboard, a mouse, a button, a pen, a touch screen, voice recognition and/or biometric mechanisms, etc. Output device 470 may include a mechanism that outputs information to the operator, including a display, a light emitting diode (LED), a speaker, etc. Communication interface 480 may include any transceiver-like mechanism that enables device 400 to communicate with other devices and/or systems. For example, communication interface 480 may include mechanisms for communicating with another network device.

As will be described in detail below, device 400 may perform certain operations relating to cost effective routing of calls. Device 400 may perform these and other operations in response to processor 420 executing software instructions contained in a computer-readable medium, such as main memory 430. A computer-readable medium may be defined as a logical or physical memory device. A logical memory device may include a space within a single physical memory device or spread across multiple physical memory devices.

Although FIG. 4 illustrates exemplary components of device 400, in other implementations, device 400 may include additional, fewer, different, or differently arranged components than those illustrated in FIG. 4 and described herein. As an example, in some implementations, input device 460 and/or output device 470 may not be implemented by device 400. In particular, device 400 may represent a network device such as SGW 310, PGW 320, P-CSCF server 335, or S-PCSF server 340. In these situations, device 400 may be a "headless" device that does not explicitly include an input or an output device.

Figure 5:
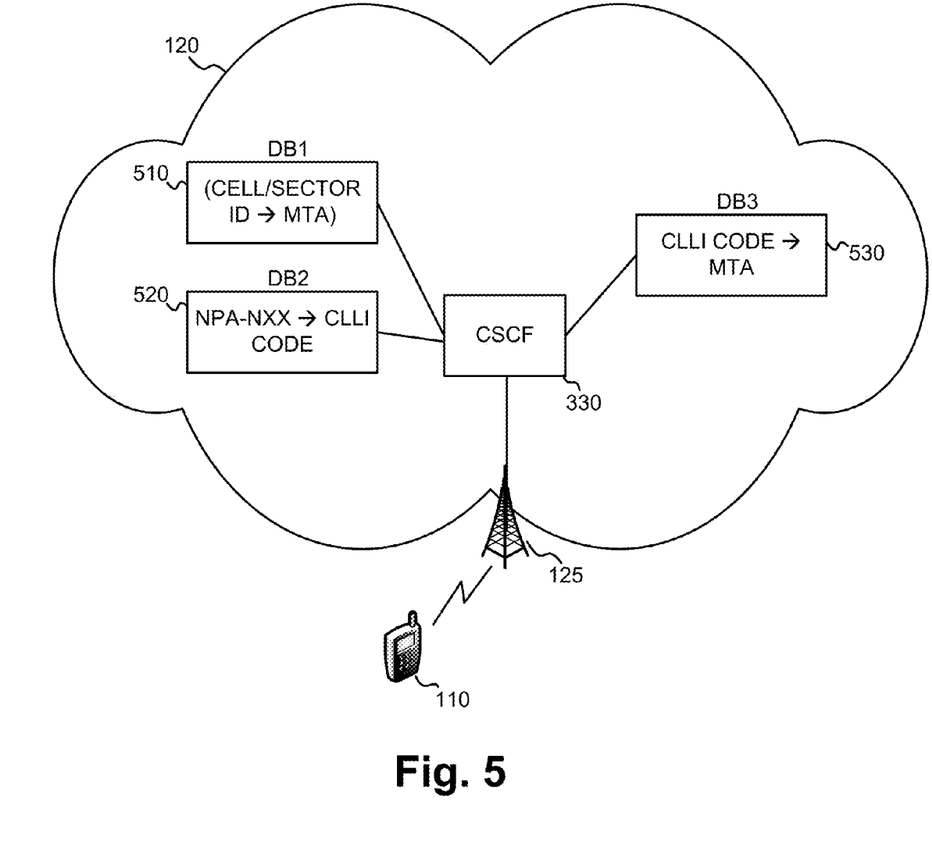
FIG. 5 is a diagram illustrating an example of components in a wireless network that may be relevant to determining whether a call is an intra-MTA (major trading area) call or inter-MTA call.

FIG. 5 is a diagram illustrating an example of components in wireless core network 120 that may be relevant to determining whether a call is an intra-MTA or inter-MTA call. Wireless network 120, in FIG. 5, is illustrated as a simplified version of wireless network 120, as shown in FIG. 3, but additionally includes components relating to the determination of whether a call is an intra-MTA or inter-MTA call. These additional components include a first database (DB1) 510, a second database (DB2) 520, and a third database (DB3) 530.

First database 510 may include a mapping of cell and/or sector identifiers to the MTAs in which the cell/sector identifiers are located. Base stations in a wireless network, such as base stations 125, may each be assigned identifiers. The identifiers, which may correspond to a particular cell or sector in a cellular network, may be included in signaling messages generated by mobile devices 110 that are in communication with a particular base station. Because the geographical location of base stations 125 is fixed, the cell/sector identifiers correspond to particular MTAs. First database 510 may be populated based on an initial setup of wireless network 120 and may only need to be updated when the base station is added to or removed from wireless network 120. In one implementation, first database 510 may be queried using a key derived from a concatenation of a cell identifier and sector identifier.

Second database 520 may include a mapping of NPA-NXX codes to home switch CLLI (common language location identifier) codes. NPA-NXX codes are codes assigned as part of telephone numbers under the North American Numbering Plan (NANP). The NANP is a standardized system of numbering plan areas (NPA), which have evolved over time into a system of three-digit area codes and seven-digit telephone numbers. The "NPA" portion of a telephone number represents the numbering plan area ("area code") of the telephone number and the "NXX" portion of a telephone number represents the central office exchange code. CLLI codes may include known identifiers used within the North American telecommunications industry to identify telecommunication equipment. Additionally, or alternatively, second database 520 may map other types of numbering plan codes to codes that identify telecommunication equipment.

In situations in which a called number is a ported number or pooled number, the call may be routed based on the LRN (Location Routing Number) associated with the called number and not the called party number itself. References to the NPA-NXX of the called party number herein refer to the "normal" NPA-NXX of the called party number if the called party number is not ported or pooled and the NPA-NXX of the LRN associated with the called number if the called party number is a ported or pooled number.

The information defining the NPA-NXX to CLLI code mapping, as performed by second database 520, may be obtained for second database 520 using, for example, the LERG database. The LERG is a commercially available database that includes information on telephone switches and the phone numbers covered by the switches.

Third database 530 may include a mapping of CLLI codes (or other types of codes that identify telecommunication equipment) to the MTAs in which the CLLIs are located. Because telephone switches are typically deployed in a stationary location, the CLLI codes associated with the switches may be used to obtain the particular MTA for the telephone switch.

First database 510, second database 520, and third database 530 may be accessed by CSCF 330 when determining whether a call is an intra-MTA or inter-MTA call. In alternative implementations, other components, such as application servers associated with or used by CSCF 330 may instead or additionally access first database 510, second database 520, and/or third database 530.

Although first database 510, second database 520, and third database 530 are called "databases" herein, in some implementations, each database may be implemented in a form other than a database, such as a simple lookup table, file-based storage structure, etc. Additionally, each database 510, 520, and 530, although shown as a separate component in FIG. 5, may be implemented as part of, for example, CSCF 330 (e.g., as part of P-CSCF server 335 and/or S-CSCF server 340). Additionally, although shown as separate databases 510, 520, and 530, the functionality of databases 510, 520, and 530 may be combined and be implemented by one or two databases.

Figure 6:
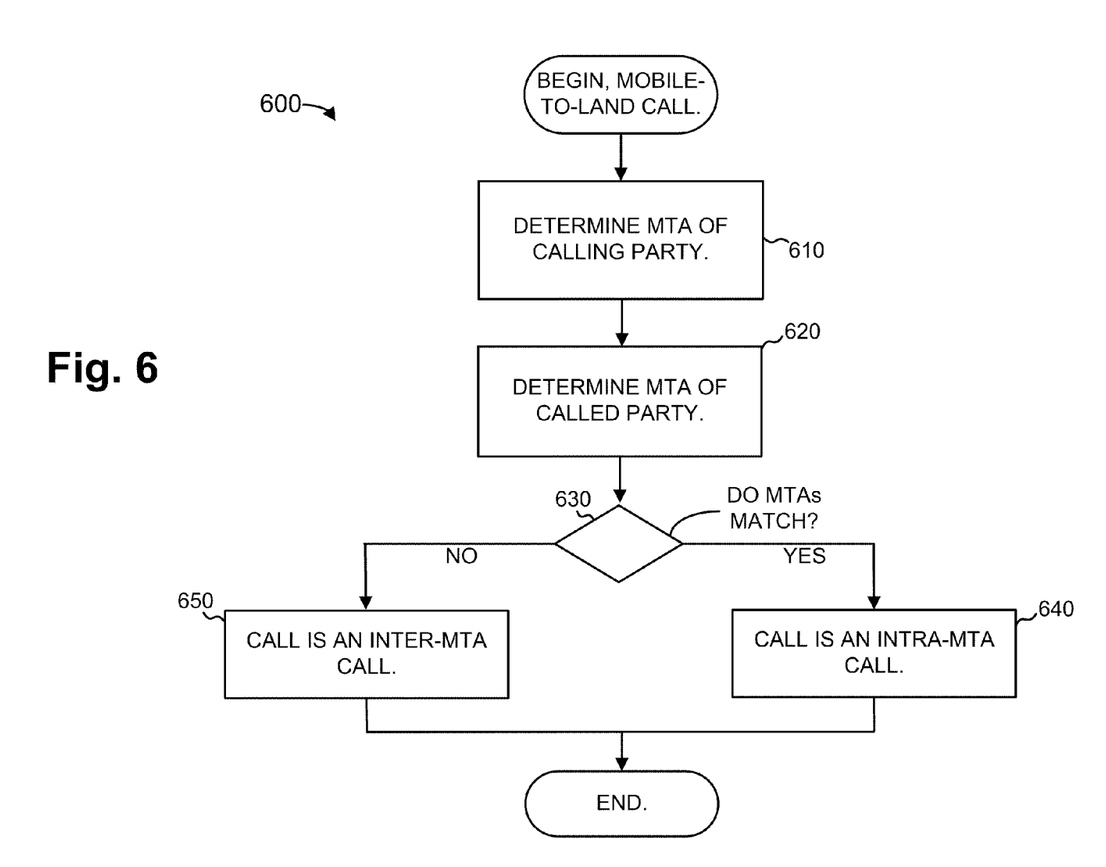
FIG. 6 is a flow chart illustrating an example of a process for determining whether a mobile-to-land call is an intra-MTA call.

FIG. 6 is a flow chart illustrating an example of a process 600 for determining whether a mobile-to-land call is an intra-MTA call. Process 600 may be performed, for example, by CSCF 330 or other components acting during the connecting stage of a call, such as a call processed by an IMS-based network using SIP signaling.

Process 600 may include determining the MTA of the calling party (i.e., the MTA at which the call originated) (block 610). In one implementation, CSCF 330 may determine the MTA of the calling party based on the cell or sector identifier of the portion of the wireless network in which the call was placed. A mobile device placing a call may initial send a SIP INVITE message to CSCF 330. The SIP INVITE message may be forwarded by CSCF 330 to a destination device, which can choose to accept the "invite" to begin the call. Under IMS, the SIP INVITE message may include fields that include that cell identifier and sector identifier of the base station with which the mobile device is communicating. CSCF 330 may, for example, use these fields to query first database 510 to obtain the MTA of the calling party.

Process 600 may further include determining the MTA of the called party (block 620). This determination may, for example, be based on the called number, such as the NPA-NXX code portion from the called number. In situations in which the called number is a ported or pooled number, the determination may be based on the LRN that is associated with the called number. The called number may be included in the SIP INVITE message. CSCF 330 may, for example, use the NPA-NXX code to query second database 520 to obtain the CLLI code. CSCF 330 may use the CLLI code to query third database 530 to obtain the MTA of the calling party. As previously mentioned, in some implementations, the queries to second database 520 and third database 530 may be combined or second database 520 and third database 530 may be combined as a single query or database.

Process 600 may further include determining whether the MTA of the calling party and the MTA of the called party match one another (block 630). If the MTAs are the same, (block 630—YES), the mobile-to-land call may be determined to be an intra-MTA call (block 640). If the MTAs are not the same, (block 630—NO), the mobile-to-land call may be determined to be an inter-MTA call (block 650).

As previously mentioned, if the call is determined to be an inter-MTA call (block 650), the call may be routed through IXC 130 (FIG. 2, block 230). Routing the call to IXC 130 may include CSCF 330 forwarding the call through wireless network 120 to IXC 130. If, however, the call is determined to be an intra-MTA call (block 640), the call may be routed through a LEC, such as LEC 150 (FIG. 2, block 220).

Routing of an intra-MTA call through a LEC, such as LEC 150, will now be described in further detail with reference to FIGS. 7 and 8.

Figure 7:
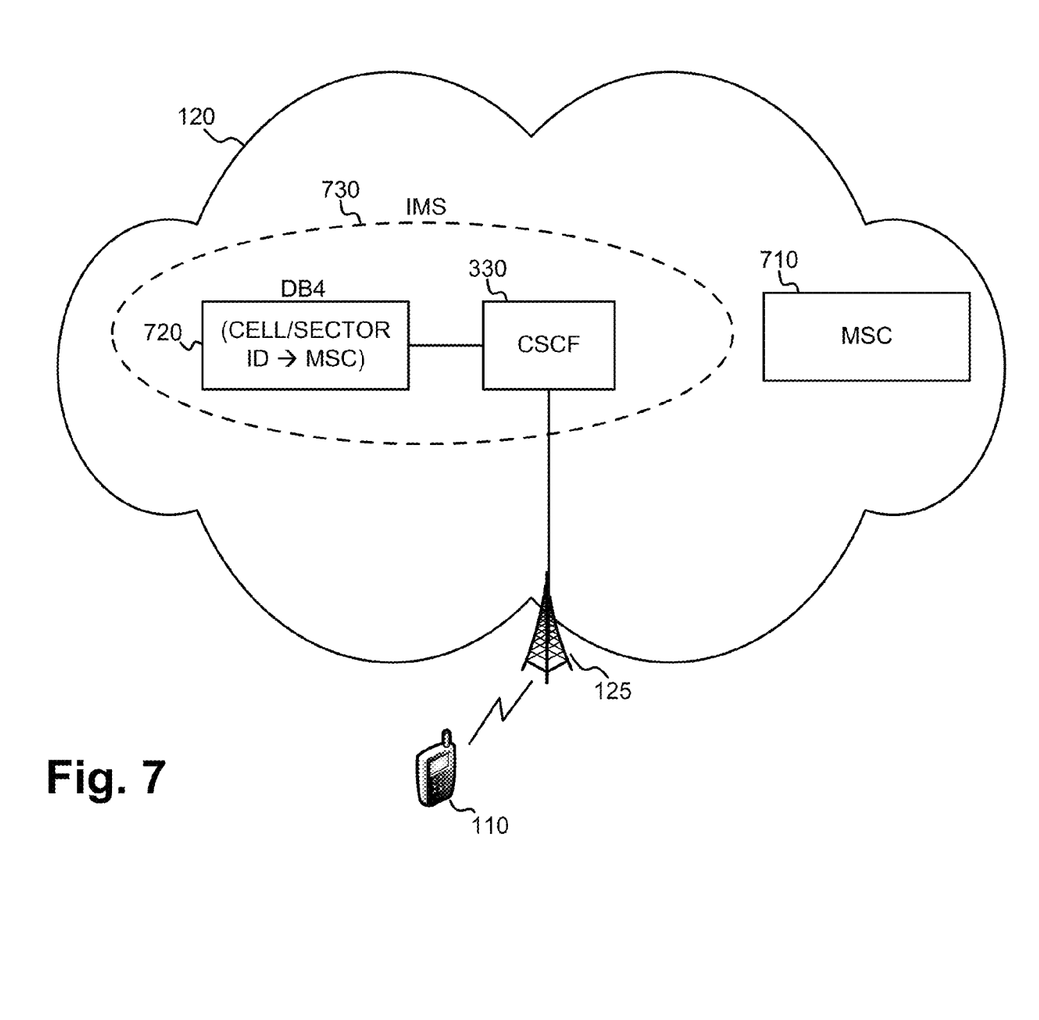
FIG. 7 is a diagram illustrating an example of components in a wireless network that may be relevant to routing an intra-MTA call through a local exchange carrier.

FIG. 7 is a diagram illustrating an example of components in wireless network 120 that may be relevant to routing an intra-MTA call through LEC 150. Wireless network 120, in FIG. 5, is illustrated as a simplified version of wireless network 120, as shown in FIG. 3, but additionally includes components relating to routing an intra-MTA call. These additional components may include mobile switching center (MSC) 710 and a fourth database (DB4) 720. Components in wireless network 120 that are particularly part of IMS (fourth database 720 and CSCF 330) are shown within oval 730.

MSC 710 may be included in wireless network 120 but may be a component in a circuit switched portion of wireless network 120.

MSC 710 may include a network device, such as a server, that acts as the primary service delivery node for voice calls or other network services in a circuit switched network. MSC 710 may operate as part of a Global System for Mobile Communications (GSM) mobile communication standard or code division multiple access (CDMA). MSC 710 may be responsible for setting-up and releasing end-to-end connections, handling mobility and hand-over requirements during a call, and taking care of charging and real time pre-paid account monitoring.

Fourth database 720 may include a mapping of cell and/or sector identifiers to MSCs in the circuit-switched network of wireless network 120. In particular, the MSC corresponding to each cell/sector identifier combination may correspond to the MSC that serves the geographical area corresponding to the cell/sector identifier. Fourth database 720 may be populated based on an initial setup of wireless network 120. The MSCs in fourth database 720 may be set such that only MSCs that have a direct connection to the LEC are included in database 720. Further, in situations in which multiple MSCs serve a single MTA, the MSC entered in fourth database 720 may be the one that can most efficiently directly route calls to the LEC.

Although called a "database" herein, fourth database 720, in some implementations, may be implemented in a form other than a database, such as a simple lookup table, file-based storage structure, etc. Additionally, database 720, although shown as a separate component in FIG. 7, may be implemented as part of, for example, CSCF 330.

Although FIG. 7 illustrates exemplary components of wireless network 120, in other implementations, wireless network 120 may include additional, fewer, different, or differently arranged components than those illustrated in FIG. 7 and described herein. Further, one or more of the components shown in FIG. 7 may perform functions described as being performed by other of the components shown in FIG. 7.

Figure 8:
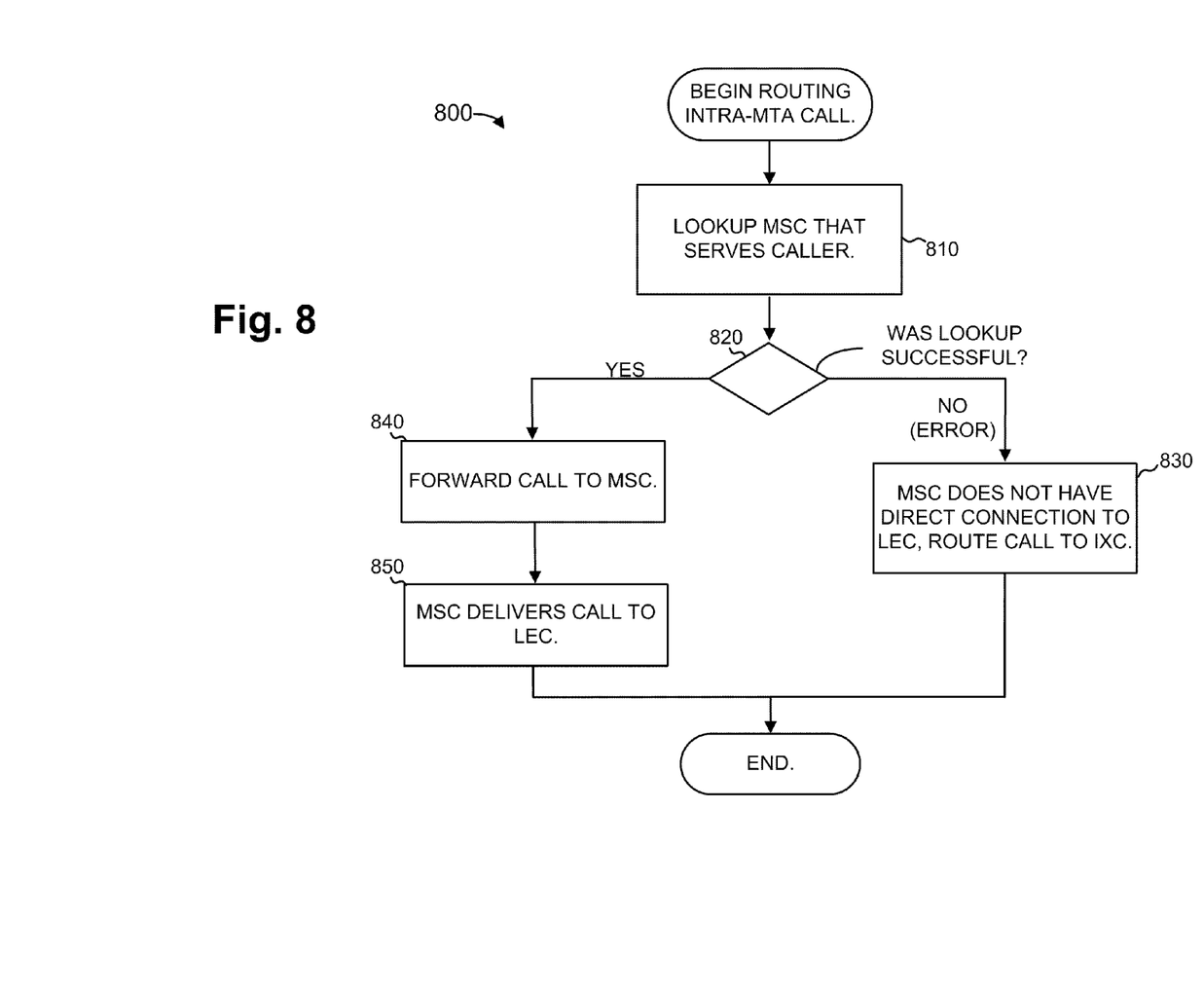
FIG. 8 is a flow chart illustrating an example of a process for routing an intra-MTA call to a local exchange carrier.

FIG. 8 is a flow chart illustrating an example of a process 800 for routing an intra-MTA call to a LEC, such as LEC 150. Process 800 may be performed, for example, by CSCF 330 during the connecting stage of a call, such as a call processed by an IMS-based network using SIP signaling.

Process 800 may include looking-up the MSC that serves the mobile device of the caller (block 810). For example, CSCF 330 or another IMS network device may query fourth database 720, based on the sector/cell identifier received in an initial SIP INVITE message, to obtain the MSC. If the lookup to obtain the MSC is successful (block 820—YES), the call may be forwarded to the looked-up MSC (block 840). A successful lookup may indicate that the MSC has a direct connection to LEC 150. The call may be forwarded to the looked-up MSC using SIP signaling. In situations in which the MSC does not support SIP, the call may be forwarded to the MSC using another technique, such as using a MGW/MGCF for SIP/SS7 interworking.

Process 800 may further include the MSC directly forwarding the call to LEC 150 without going through IXC 130 (block 850).

In some situations, process 800 may include an unsuccessful look-up of the MSC (block 820—NO). For instance, if the sector/cell identifier is not present in fourth database 720, this may indicate that there is no MSC directly connected to LEC 150 (block 830). In this case, CSCF 330 may route the call to IXC 130 (block 830).

Figure 9:
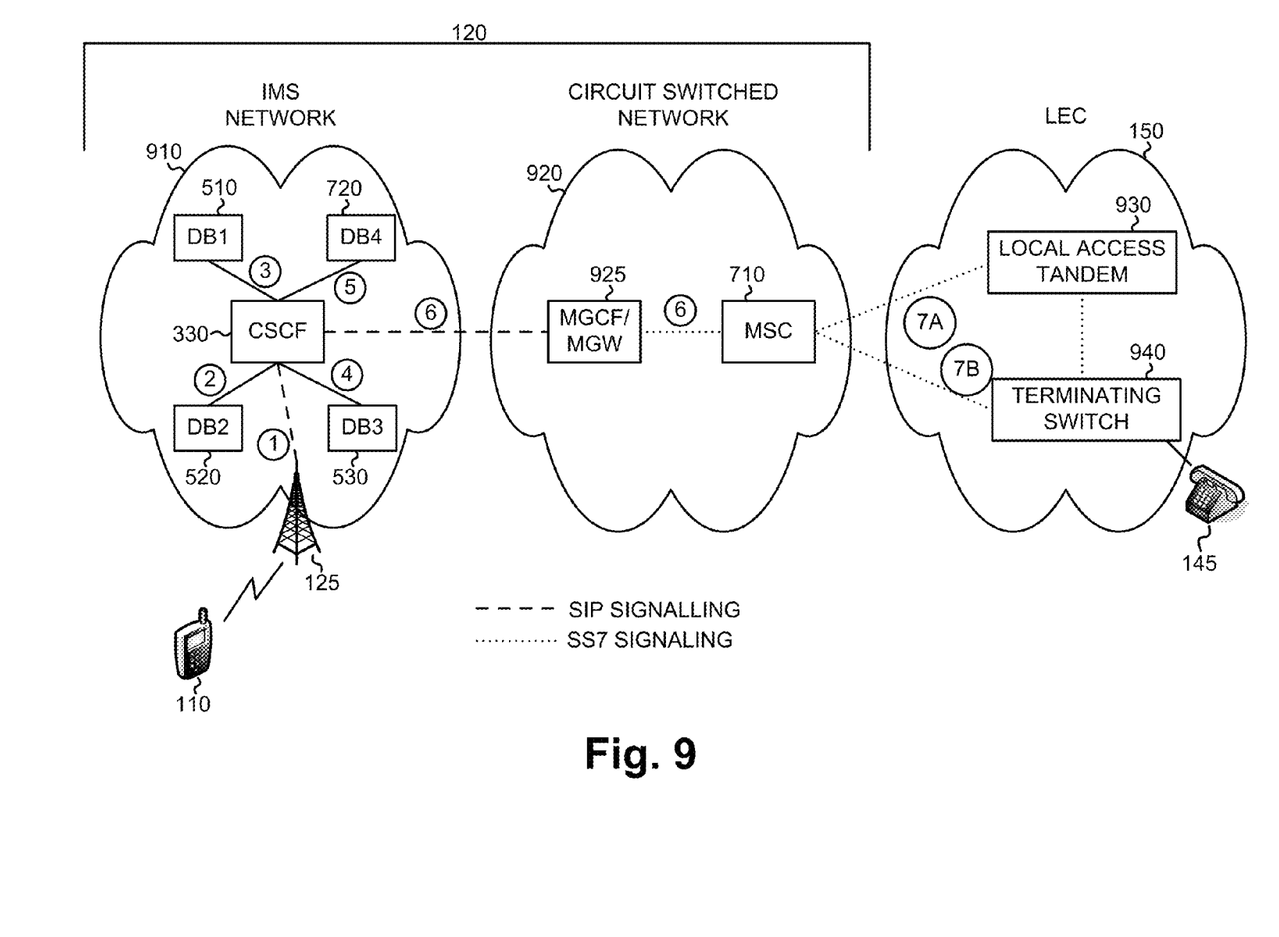
FIG. 9 is a diagram illustrating exemplary message flows for routing calls in an IMS network.

FIG. 9 is a diagram illustrating exemplary message flows for routing calls in an IMS network, as described above with respect to FIGS. 5-8. In FIG. 9, wireless network 120 is illustrated as two separate networks, IMS network 910 and circuit-switched network 920, representing the IMS and circuit-switched components, such as GSM or CDMA based circuit-switched network, of wireless network 120. LEC 150 may be connected to circuit-switched network 920.

In addition to MSC 710, circuit-switched network 920 may include a media gateway control function (MGCF) server and/or a media gateway (MGW) 925. MGCF/MGW 925 may operate to perform protocol conversion between IMS call control protocols and protocols used for circuit-switched connections. MGCF/MGW 925 may perform other functions, such as converting between different voice coding schemes and, for calls destined to IMS network 910, selection of CSCF 330.

LEC 150 may include local access tandem 930 and terminating switch 940. Local access tandem 930 may include a switch in the public switch telephone network (PSTN) that serves to connect LEC 150 to other networks. Wireless network 120 may access LEC 150 through local access tandem 930. Terminating switch 940 may include a switch that connects to a number of end-user devices, such as telephones 145.

An example flow of messages through wireless network 120 and LEC 150 will next be discussed. Messages in FIG. 9 are labeled as circled numbers.

Assume that mobile device 110 initiates a call by sending a SIP INVITE message to CSCF 330 (message 1). The SIP INVITE message may include, among other fields, the dialed digits (i.e., the destination telephone number), the sector identifier, and the cell identifier.

CSCF 330 may query second database 520 to obtain the switch CLLI code for the dialed party (message 2). CSCF 330 may also query first database 510, using the cell/sector identifiers from the SIP INVITE message, to obtain the MTA of the caller (messages 3). CFCS 330 may also obtain the terminating MTA using the looked-up CLLI code from third database 530 (message 4).

When the originating and terminating MTAs are the same, CSCF 330 may query fourth database 720 to determine an MSC to use to forward the call directly to a LEC (message 5). The SIP INVITE message may then be sent to the looked-up MSC (message 6). As shown in FIG. 9, the SIP INVITE message may be forwarded to MSC 710 via MGCF/MGW 925. MGCF/MGW 925 may convert the SIP message to, for example, an SS7 (signaling system number 7) signaling, which is received by MSC 710.

MSC 710 may forward the call to local access tandem 930 (message 7A) which may then forward the call to terminating switch 940. Alternatively, in some situations, MSC 710 may have a direct connection to terminating switch 940. In this situation, MSC 710 may forward the call to terminating switch 940 (message 7B). In either the situation illustrated with message 7A or message 7B, terminating switch 940 may complete the call to the called party, such as the party associated with telephone 145.

In the example shown in FIG. 9, a call from a mobile device 110 to a landline telephone 145 is intelligently routed based particularly on whether the call is an intra-MTA mobile-to-land call. In this situation, the call may be routed directly to LEC 150. Routing the call directly to LEC 150, and thereby avoiding routing of the call through an IXC, may result in reduced routing costs for the operator of wireless network 120.

While a series of blocks has been described with regard to FIGS. 2, 6, and 8, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device-implemented method, comprising:
receiving, by the network device and from a calling party, a message initiating a call, the message including an identifier of a cell and/or a sector in a wireless network in which the call was placed, and a telephone number of a called party of the call;
determining, by the network device, a major trading area of the calling party based on the cell/sector identifier;
determining, by the network device, a major trading area of the called party based on the telephone number of the called party, the determination of the major trading area of the called party including:
querying a first database, based on the telephone number of the called party, to obtain a common language location identifier code corresponding to a telephone switch serving the called party, the query of the first database including
querying the first database based on a NPA-NXX code of the telephone number of the called party, wherein the NPA-NXX code includes a number plan area portion of the telephone number under the North American Numbering Plan and a central office exchange code portion of the telephone number and wherein when the telephone number of the called party is a ported or pooled number, the query of the first database is based on the NPA-XXX code of a location routing number associated with the telephone number of the called party, and
querying a second database, based on the common language location identifier code, to obtain the major trading area of the called party; and
routing, by the network device, the call based on whether the major trading area of the calling party matches the major trading area of the called party.

2. The method of claim 1, where determining the major trading area of the calling party further includes:
forming a query key based on a concatenation of the cell identifier and the sector identifier from the message; and
querying a third database that includes a mapping of cell identifiers and sector identifiers to major trading areas.

3. The method of claim 1, where routing the call based on whether the major trading area of the calling party matches the major trading area of the called party is performed when the call is a wireless-to-landline call.

4. The method of claim 1, where the message initiating the call includes a session initiation protocol (SIP) message in an Internet Protocol (IP) multimedia subsystem (IMS).

5. The method of claim 4, where the message initiating the call includes a SIP INVITE message.

6. A network device-implemented method, comprising:
receiving, by the network device, a message initiating a call, the message including an identifier of a cell and/or a sector in a wireless network in which the call was placed, and a telephone number of a called party of the call;
determining, by the network device, a major trading area of the calling party based on the cell/sector identifier;
determining, by the network device, a major trading area of the called party based on the telephone number of the called party; and
routing, by the network device, the call based on whether the major trading area of the calling party matches the major trading area of the called party, wherein routing the call includes forwarding the call directly to a local exchange carrier when the major trading area of the calling party matches the major trading area of the called party and forwarding the call to an inter-exchange carrier when the major trading area of the calling party does not match the major trading area of the called party, the forwarding of the call directly to the local exchange carrier including
querying a database based on the cell/sector identifier of the calling party, to identify a mobile switching center, the database including information identifying only mobile switching centers that have a direct connection to a local exchange carrier, and
forwarding the call to the identified mobile switching center.

7. A network device comprising:
one or more processors; and
one or more memories, coupled to the one or more processors, the one or more memories storing instructions, that when executed by the one or more processors, cause the one or more processors to:
receive a message initiating a telephone call from a mobile device to a landline telephone, the message including an identifier of a cell and a sector in a wireless network in which the call was placed and a telephone number of the landline telephone;
determine a major trading area of the mobile device based on the cell and sector identifiers of the mobile device, wherein the determination of the major trading area of the mobile device includes
forming a query key based on a concatenation of the cell identifier and the sector identifier from the message and querying a first database, based on the query key, the first database including a mapping of cell identifiers and sector identifiers to major trading areas;
determine a major trading area of the landline telephone based on the telephone number of the landline telephone, wherein the determination of the major trading area of the landline telephone includes querying a second database, based on a NPA-NXX code of the telephone number of the landline telephone, to obtain a common language location identifier code corresponding to a telephone switch serving the landline telephone, wherein the NPA-NXX code includes a number plan area portion of the telephone number of the landline phone under the North American Numbering Plan and a central office exchange code portion of the telephone number of the landline phone, and wherein, when the telephone number of the landline phone is a ported or pooled number, the query of the second database is based on the NPA-XXX code of a location routing number associated with the telephone number of the landline phone, and querying a third database, based on the common language location identifier code, to obtain the major trading area of the landline telephone;

determine whether the telephone call can be completed within the major trading area of the mobile device, lookup a mobile switching center corresponding to the mobile device when the telephone call can be completed within the major trading area of the mobile device, forward the message initiating the telephone call to the looked-up mobile switching center when the telephone call can be completed within the major trading area of the mobile device, and forward the message initiating the telephone call to an inter-exchange carrier when the telephone call cannot be completed within the major trading area of the mobile device.

8. The network device of claim 7, where the instructions further cause the one or more processors to:

forward the message initiating the telephone call to the inter-exchange carrier when an error occurs when looking up the mobile switching center.

* * * * *